INVENTORS
VASSAR G. LAMB
JAMES E. KIRK
BY Cameron, Kerkam & Sutton
ATTORNEYS

June 16, 1959 V. G. LAMB ET AL 2,891,112

SLUG DETECTING AND REJECTING APPARATUS FOR TELEPHONE PAY STATIONS AND OTHER COIN-OPERATED DEVICES

Filed Dec. 31, 1956 4 Sheets-Sheet 2

INVENTORS

VASSAR G. LAMB

JAMES E. KIRK

BY Cameron, Kerkam & Sutton

ATTORNEYS

INVENTORS
VASSAR G. LAMB
JAMES E. KIRK.
BY Cameron, Kerkam & Sutton
ATTORNEYS

INVENTORS
VASSAR G. LAMB
JAMES E. KIRK
BY *Cameron, Kerkam & Sutton*
ATTORNEYS

United States Patent Office 2,891,112

Patented June 16, 1959

2,891,112

SLUG DETECTING AND REJECTING APPARATUS FOR TELEPHONE PAY STATIONS AND OTHER COIN-OPERATED DEVICES

Vassar G. Lamb and James E. Kirk, Dalton, Ga.

Application December 31, 1956, Serial No. 631,590

12 Claims. (Cl. 179—6.3)

This invention relates to apparatus for preventing the operation of coin-operated devices by the use of spurious coins, and is particularly directed to a mechanism for detecting and rejecting slugs of magnetic material when inserted in the coin slots of telephone pay stations and similar apparatus.

Inasmuch as the mechanism of the present invention is especially well adapted for use with pay telephones, the following disclosure will be directed to this specific application of the inventive concept. By so doing, however, it is not intended to limit the scope of the invention to telephone apparatus because it will be evident that the device is also useful in connection with various other types of coin-controlled machines.

Iron and steel washers of the same sizes as nickels and quarters are the slugs most commonly used by persons attempting to defraud telephone companies. It is therefore the principal aim of the invention to provide a structurally simple, reliable and jam-proof apparatus for preventing the successful use of magnetic slugs in telephone pay stations.

Another object is to provide an improved slug detecting and rejecting mechanism of the magnetic type which may be readily installed on pay telephones of standard construction already in the field as well as incorporated in new equipment.

A further object of the invention is the provision of a novel device of the character described which is so constructed that a slug of magnetic material cannot be jarred or forced down into one of the coin chutes of a telephone pay station, so as to close a circuit or signal the operator as if a genuine coin had been deposited, as long as the receiver or handset is off the hook.

Another object is to provide an electromagnetic slug detector for telephone pay stations which will release and reject even a partially magnetized slug as soon as the telephone instrument is replaced on the hook.

These and other objects will appear more fully upon consideration of the following detailed description of the embodiment of the invention which is illustrated in the accompanying drawings. In this connection, it is to be expressly understood that these drawings are intended for purposes of illustration only and are not to be constructed as defining the limits of the invention, for which latter purpose reference should be had to the appended claims.

In the drawings, wherein like reference characters indicate like parts throughout the several views.

Figure 1:
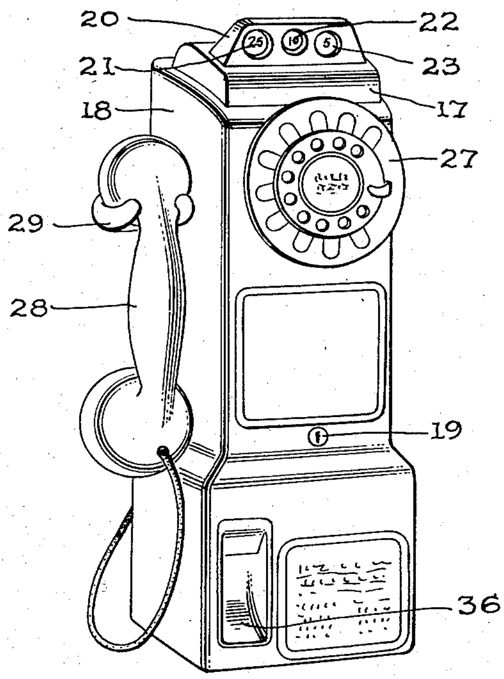
Fig. 1 is a perspective view of a standard form of telephone pay station to which the slug detecting mechanism of the present invention has been added.

As indicated in Fig. 1 the slug detector of the present invention is adapted to be mounted in a tamper-proof housing 17 on top of the casing 18 of a standard telephone pay station intermediate the upper wall of said casing and a coin receptacle 20 having the usual coin recesses 21, 22 and 23 and associated slots 24, 25 and 26 for receiving quarters, dimes and nickels, respectively. The telephone equipment is of conventional construction and includes a dial 27 and a combination transmitter-receiver handset 28 adapted to hang on a hook 29 which, when the handset is removed therefrom, is elevated by a spring and conditions the telephone circuit for use in a manner well known to the art. The casing 18 is also provided with the usual lock 19 so that unauthorized persons may not have access to the coin-operated mechanism within the casing.

The slug detecting mechanism comprises three similar electromagnetic units 30, 31 and 32, associated with coin slots 24, 25 and 26, respectively, which are so constructed and arranged that, should a slug of magnetic material be inserted in one of the coin recesses after the handset 28 has been removed from hook 29, the associated electromagnetic unit will magnetically attract and hold the slug against passage downwardly into the corresponding one of coin chutes 33, 34 and 35 inside casing 18, thereby preventing the slug from completing the dial tone circuit or signaling the operator as if a genuine coin had been deposited. When the handset 28 is replaced on hook 29, the electromagnetic units 30, 31 and 32 are deenergized, and any slugs that may have ben caught and held thereby will be released and ejected therefrom as hereinafter described so as to drop into their respective coin chutes and either return to the user of the telephone through the conventional coin return receptacle 36, or, if desired, be diverted into the usual coin collecting box inside casing 18.

In the embodiment illustrated, electromagnetic units 30, 31 and 32 are mounted side-by-side in an open-end frame (see Figs. 2–4) comprising a base plate 37 having an upwardly extending flange 38 at its rear edge, a top plate 39 having a pair of downwardly turned arms 40 at the extremities of its rear edge which are adapted to be removably connected to flange 38 by bolts 41, and a pair of supporting posts 42 which are interposed between base plate 37 and top plate 39 adjacent their front edges and are removably connected thereto by screws 43 and 44. The frame thus formed is removably secured to the forwardly inclined portion of the top of telephone casing 18 by screws 43 and bolts 45. These screws and bolts pass through the holes in the casing which normally receive the bolts used to fasten coin receptacle 20 to the casing in a standard telephone pay station installation. However, when the telephone is provided with the slug detecting device of the present invention, coin receptacle 20 is detachably mounted on top plate 39 by screws 44 and 46 the axes of which are aligned with those of screws 43 and bolts 45, respectively.

Figure 2:
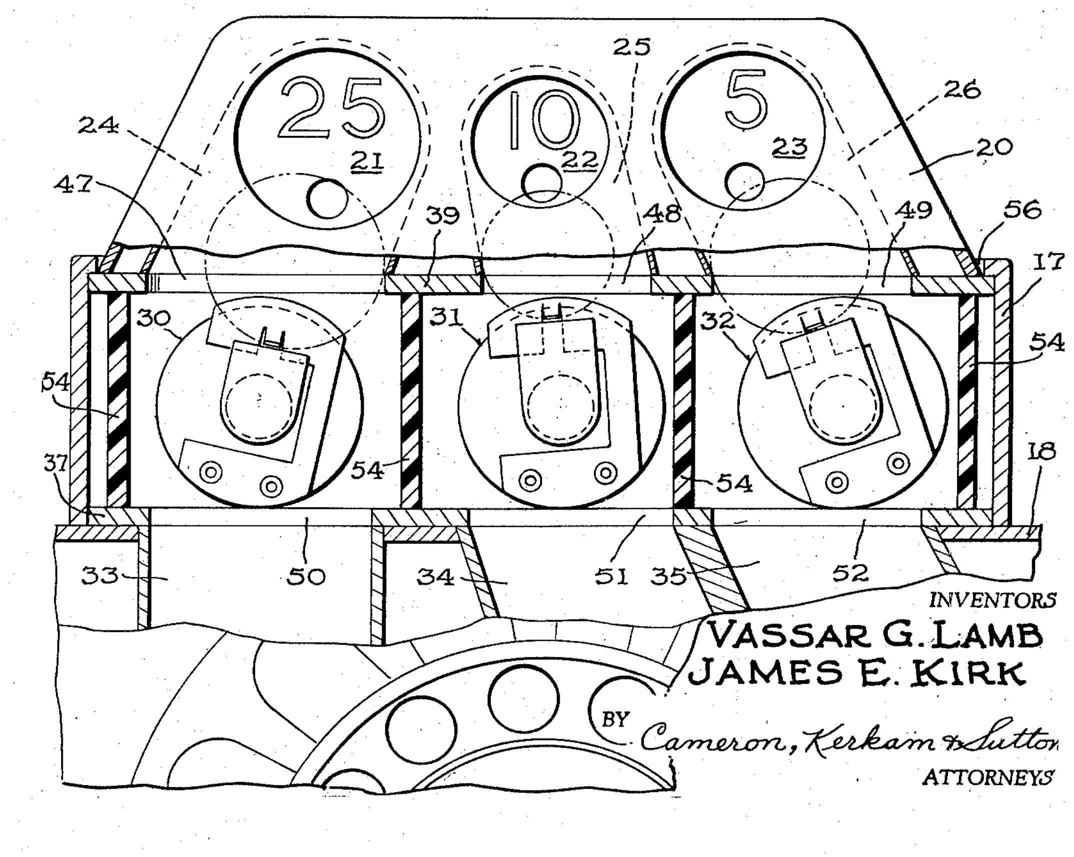
Fig. 2 is an enlarged front view of the upper portion of the telephone shown in Fig. 1, partially in section along the line 2—2 in Fig. 4.
Figure 3:
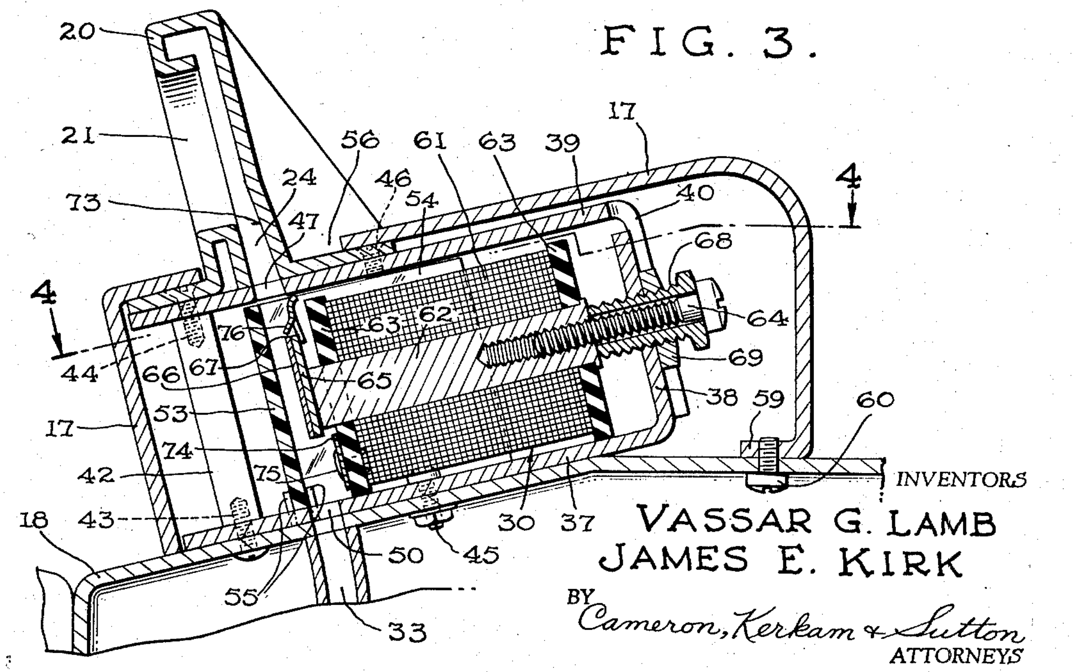
Fig. 3 is a side sectional view taken substantially on line 3—3 in Fig. 4.

As indicated in Figs. 2 and 3, top plate 39 of the detector frame is provided with openings 47, 48 and 49 which register with the lower ends of coin slots 24, 25 and 26, respectively, while base plate 37 has similar openings 50, 51 and 52 in alignment with the upper ends of coin chutes 33, 34, 35, respectively. In order that a coin or slug which drops from one of the coin slots through the aligned opening in top plate 39 may be properly guided into the corresponding opening in base plate 37 and the aligned coin chute, a partition 53 is provided which extends transversely across the detector frame and is so shaped and positioned as to be substantially coplanar with the front edges of the openings in said plates. Integral with and extending rearwardly from partition 53 are four parallel wing partitions 54 which laterally confine the spaces through which the coins or slugs drop past electromagnetic units 30, 31 and 32. Partition 53 and wing partitions 54 are preferably made of a transparent plastic material to facilitate inspection of the detector mechanism, and may be maintained in proper position in any suitable manner, as by a plurality of pairs of guide pins 55 which extend upwardly from base plate 37 on opposite sides of the lower edge of partition 53.

The protective housing 17 of the slug detecting mechanism is provided with an opening 56 in its top wall through which coin receptacle 20 projects and has an open bottom which enables it to be moved downwardly over the detector frame after the latter has been secured to the top of casing 18. The bottom edge of the front wall of housing 17 is provided with an inwardly projecting lip 57 which is adapted to be engaged beneath a hold-down lug 58 fixed to the forward edge of the frame base plate 37 (see Fig. 4), while the bottom edge of the rear wall of the housing has an inwardly turned, horizontally extending flange 59 adapted to rest on the horizontal portion of the top of casing 18 and to be secured thereto by screws 60. Inasmuch as screws 60 are threaded upwardly into flange 59 from within casing 18, as indicated in Fig. 3, it is evident that detector housing 17 can be removed only by someone having access to the inside of the casing, such as a telephone installer or maintenance man. The slug detecting mechanism is thus protected against tampering by persons who might wish to render the mechanism inoperative.

Housing 17 is preferably made of iron or steel so as to act as a shield for the magnetic fields of the electromagnetic units enclosed thereby and thus minimize interference with the reception of conversation by the user of the telephone.

An important advantage of the structure above described is the ease with which the slug detecting mechanism may be added to a standard telephone pay station. Such an installation is accomplished by simply removing coin receptacle 20 from its usual position, boring two additional holes in the top of casing 18 to receive screws 60, securing the the detector frame to the top of the casing by screws 43 and bolts 45, remounting the coin receptacle on top plate 39 by screws 44 and 46, and then lowering housing 17 over the coin receptacle and detector mechanism and fixing it in place by means of screws 60 and the locking action of lip 57 and hold-down lug 58.

Referring now to the structure of electromagnetic units 30, 31 and 32, each unit comprises a cylindrical energizing coil 61 mounted on an axially extending core 62 of magnetic material between a pair of insulating end plates 63, the rear end of core 62 being internally threaded to receive a mounting screw 64 while its front end is provided with a radial extension or pole piece 65, welded or otherwise permanently fixed thereto. In the embodiment illustrated, core extension 65 is bimetallic, consisting of a relatively thin plate 66 of brass, copper or other non-magnetic material suitably united to the front or outer face of the main body of the extension which is directly connected to core 62. Plate 66, hereinafter referred to as the residual core extension plate, may have a thickness of from .015" to .020", while the main body of core extension 65 is of approximately the same thickness as a nickel, i.e., about .075". The functions of residual plate 66 will be described later.

Figure 4:
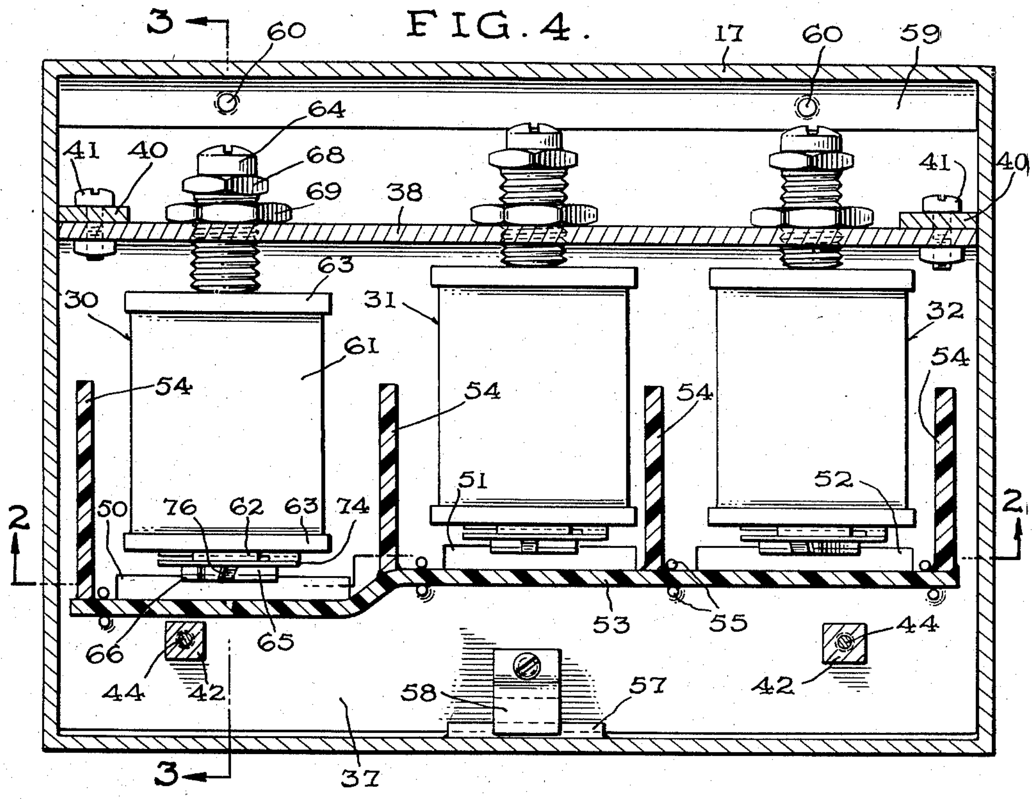
Fig. 4 is a plan sectional view taken substantially on line 4—4 in Fig. 3.

As will be seen from Figs. 2, 3 and 4, each of electromagnetic units 30, 31 and 32 is adapted to be so mounted in the supporting frame that its core extension 65 projects forwardly part way into the space between the openings in top plate 39 and base plate 37 through which the coins or slugs are intended to drop, leaving enough space between transversely extending partition 53 and the substantially parallel forward face of residual plate 66 to permit the passage of a coin or slug. Each of the units is so oriented about its own axis that the axial mid-plane of its core extension is substantially coplanar with the path followed by the center of a coin or slug as it drops through the associated coin slot.

Although all of core extensions 65 are of the same U-shape in outline, they differ in radial length or height in inverse proportion to the diameters of the slugs which the respective units are adapted to detect, i.e., the core extention of unit 30, associated with the quarter coin slot 24, is the shortest while that of unit 31, which is associated with the dime slot 25, is the longest. The upper edge 67 of each core extension is perpendicular to the axial mid-plane thereof and forms a ledge onto which the magnetic field of coil 61 is adapted to draw any magnetic slug attempting to drop from the associated coin slot into the corresponding coin chute, and which supports the intercepted slug thereon as long as said coil remains energized.

In order to facilitate mounting and adjustment of electromagnetic units 30, 31 and 32, each unit is provided with an externally threaded, internally smooth sleeve or thimble 68 surrounding mounting screw 64, said sleeve being adjustably threaded into the vertical flange 38 of base plate 37 and normally butting its forward end against the rear end of core 62 into which screw 64 is threaded. By threading sleeve 68 forwardly or rearwardly through flange 38 and then drawing the rear end of core 62 into abutment with the forward end of the sleeve by means of screw 64, the electromagnetic unit may be adjusted in an axial direction so as to properly position core extension 65 relative to partition 53. Sleeve 68 is preferably provided with a lock nut 69 for retaining the sleeve in the desired adjusted position. When the axial position of the unit has been thus adjusted, it may be oriented about its axis so as to bring the ledge 67 of core extension 65 into a position substantially perpendicular to the path of movement of a slug as it drops through the coin slot of receptacle 20 by simply rotating screw 64.

Figure 11:
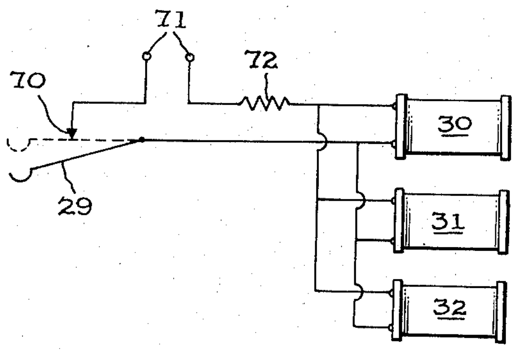
Fig. 11 is a schematic diagram of the electrical circuit of the slug detecting units of the apparatus shown in Figs. 1–4.

As indicated in Fig. 11, the coils 61 of electromagnetic units 30, 31, 32 are adapted to be electrically energized by a circuit which is controlled by the movements of hook 29 of the telephone pay station. When handset 28 is removed from hook 29, upward movement of the hook closes the circuit at contact 70 and simultaneously energizes all of coils 61 from a suitable source of power 71 through a resistance 72, it being understood that the voltage and type of current of source 71, the size of resistance 72 and the characteristics of coils 61 are appropriately selected so as to produce a relatively strong attracting magnetic field in the space between the forward ends of said coils and partition 53, sufficient to attract slugs of magnetic material and draw them onto the upper edges 67 of core extensions 65 into the position indicated in Fig. 6, but insufficient to divert a genuine coin from its normal downward passage through the space between the core extension and partition 53.

Figure 5:
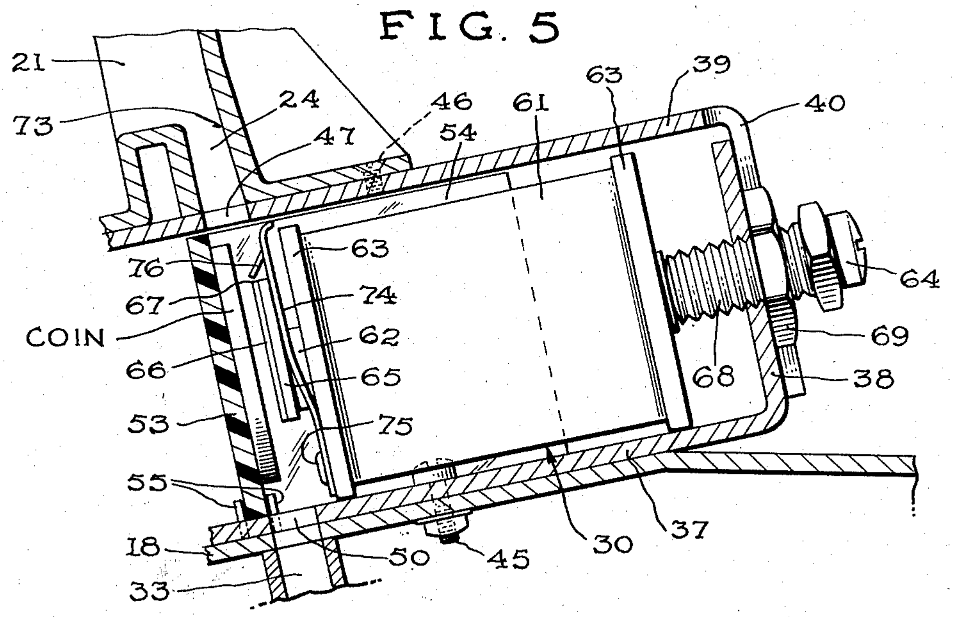
Fig. 5 is an enlarged side view, partially in section, of one of the electromagnetic slug detecting units of the mechanism of Figs. 1–4 illustrating how the device operates when a genuine coin is deposited in one of the recesses of the conventional coin receptacle on top of the pay station.

If, after coils 61 have been energized by removal of handset 28 from hook 29, a genuine coin is deposited in one of the coin recesses of receptacle 20, e.g. recess 21, it will drop freely through the associated slot 24, the aligned opening 47 in top plate 39, the space in front of unit 30 and the opening 50 in base plate 37 into coin chute 33, as indicated in Fig. 5. If, however, a magnetic slug is inserted in the coin recess, the magnetic field of coil 61 of unit 30 will become effective as soon as the lower edge of the slug passes through opening 47 and will draw the slug onto the intercepting ledge provided by the upper edge 67 of core extension 65, in the manner indicated in Fig. 6. As shown in the latter figure, the slug comes to rest on the core extension in a tilted position wherein it substantially fills both the coin slot 24 and the lower portion of the coin receiving recess 21. By stopping and holding the slug in this position, which is the reason why the core extensions of the various units are of different heights, the user of the telephone is prevented from forcing another slug downwardly through the coin slot while the handset 28 remains off hook 29. In order to prevent the slug user from reversing the tilt of the slug by pressing against its upper edge through recess 21, and thereby sliding it off the supporting edge 67 of core extension 65 so that it may be pushed on downwardly past detector unit 30 to close the telephone circuit or signal the operator as if a genuine coin had been deposited, the rear wall of the coin slot is slanted as indicated at 73 so that the rear face of the entire upper portion of the slug lays flat against the slanted portion of said wall.

When handset 28 is replaced on hook 29, the circuit of coils 61 is opened and the coils are deenergized, whereupon any slug that may have been intercepted and held by the magnetic action of the coils is released and free to drop downwardly into the respective coin chute and either be returned to the user through return receptacle 36 or, if the operator so desires, be diverted into the usual coin collecting box inside casing 18.

Figure 6:
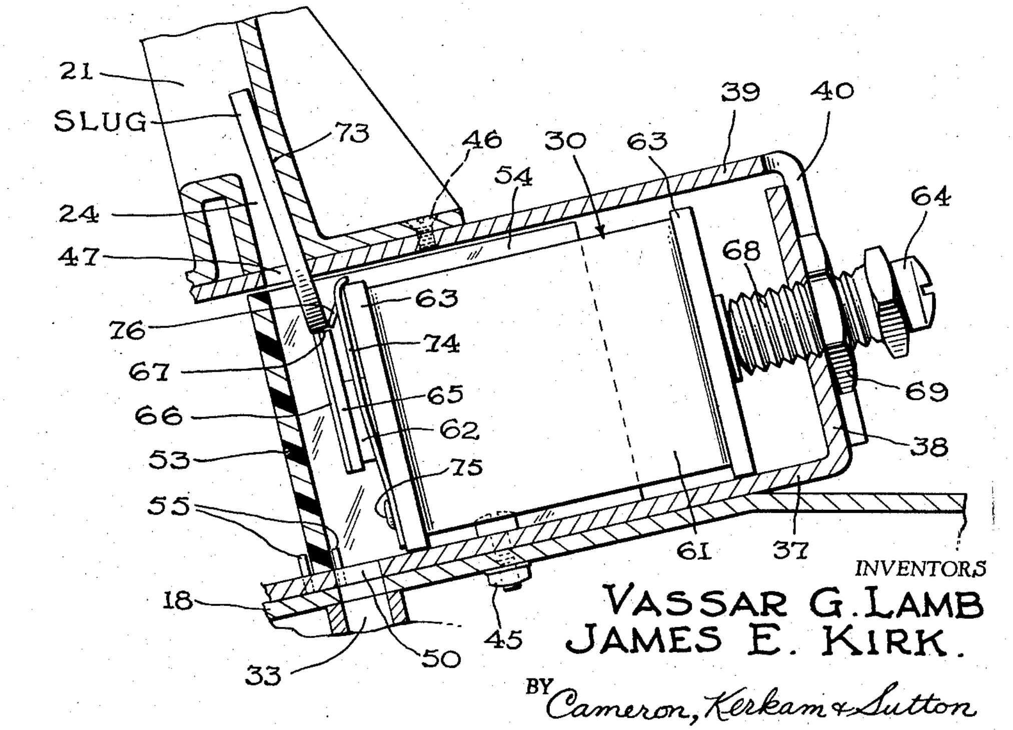
Fig. 6 is a view similar to Fig. 5 illustrating the operation when a magnetic slug is deposited.

In order to insure ejectment of slugs from the detecting mechanism when the electromagnetic units are deenergized, each unit is provided with suitable means for positively dislodging a slug from the position shown in Fig. 6. In the embodiment illustrated, each unit is provided with a yieldable slug ejecting member in the form of a relatively thin, substantially C-shaped leaf spring 74 of non-magnetic material, such as copper, which is fixed to forward end plate 63 of the unit by rivets or screws 75 in a position such that the upper, substantially horizontal arm of the spring passes behind and also extends above the upper end of core extension 65. As shown best in Figs. 7 and 8, the lower horizontal arm of the spring receives rivets or screws 75 and the vertical arm is offset from the core extension and suitably bent to provide the desired resiliency. The upper arm of spring 74 is cut vertically to form a tongue 76 which may be bent forwardly to a position such that, when the lower edge portion of said upper arm is in abutment with the rear face of core extension 65, the lower free edge of tongue 76 lies just above the upper edge of residual plate 66 of core extension 65, as shown in Fig. 8. This is the normal position of spring 74.

When the circuit of the detecting mechanism is energized and a magnetic slug is pulled onto the upper edge 67 of core extension 65, spring 74 yields and is moved rearwardly by the slug to the position shown in Fig. 6, wherein the rearwardly curved upper edge portion of the spring comes into abutment with the upper edge of front end plate 63 of the electromagnetic unit. When the circuit is deenergized and the slug is no longer held by the magnetic field of coil 61, the resiliency of spring 74 returns it to the normal position shown in Figs. 5 and 8, and the tongue 76 pushes the lower edge portion of the slug off core extension 65 so that the slug may drop downwardly through opening 50 in base plate 37 into coin chute 33.

Due to the fact that the outer pole face of core extension 65 is covered by non-magnetic residual plate 66, the slugs may drop without actual contact with the magnetic body portion of the core extension, a condition which insures against the possibility that a partially magnetized slug may stick to the outer face of the core extension. Residual plate 66 also performs the additional function of preventing the user of the telephone from jarring or jiggling the detector mechanism in such a manner as to cause a slug to slide out to and off the edge of the core extension. Even were the slug to be jarred or jiggled out to the edge of the magnetic body portion of core extension 65, residual plate 66 would still provide sufficient additional surface to support the slug and prevent it from slipping off the core extension.

Figure 7:
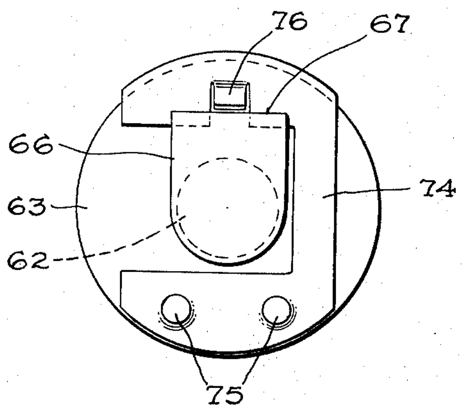
Figs. 7 and 8 are enlarged front and fragmentary side views, respectively, of the lug detecting unit of Figs. 5 and 6 showing one form of spring used for ejecting a slug from the unit when the latter is deenergized by replacement of the receiver or handset on the hook.
Figure 8:
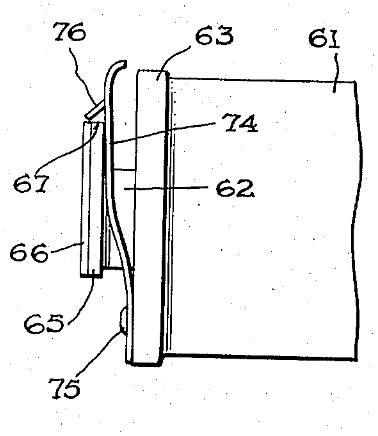
Figure 9:
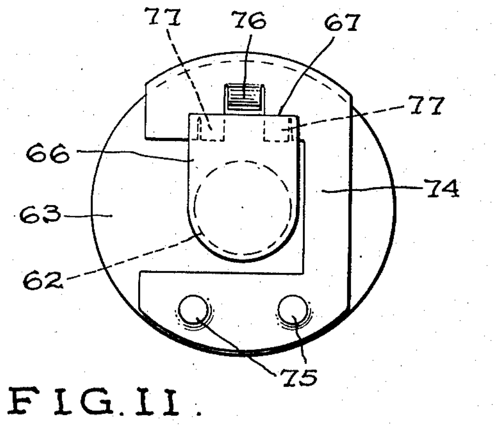
Figs. 9 and 10 are view similar to Figs. 7 and 8 showing a modified form of slug ejecting spring.
Figure 10:
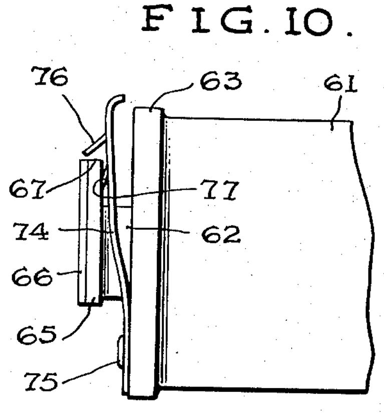

The modified form of slug ejecting spring shown in Figs. 9 and 10 is of substantially the same construction as that of Figs. 7 and 8 except that the portions of the upper arm of spring 74 adjacent tongue 76 extend downwardly behind core extension 65 somewhat further than in the previously described embodiment and are slit vertically at two additional points so as to provide a pair of auxiliary tongues 77 which may be bent to various positions so as to provide an adjustable stop for establishing the normal position of the spring.

Although only one specific form of slug detecting apparatus (including a modification of one of the elements thereof) has been described and illustrated in the accompanying drawings, it will be obvious that the invention is not limited to the exact structures shown, but is capable of a variety of mechanical embodiments. Various changes, which will now suggest themselves to those skilled in the art, may be made in the form, details of construction and arrangement of the parts, and in the electrical circuit for energizing the electromagnetic elements of the apparatus, without departing from the spirit of the invention. Reference is therefore to be had to the appended claims for a definition of the limits of the invention.

What is claimed is:

1. Apparatus for preventing the use of slugs of magnetic material in a coin-operated device of the type having a coin receiving slot and a coin chute leading to the coin-actuated mechanism of the device, comprising an electromagnet having an energizing coil and a core extending axially beyond one end of the coil to a point adjacent the path of movement of a coin or slug passing from said coin slot to said coin chute, the axially extending portion of said core being so constructed and arranged as to provide a surface onto which a slug may be drawn by the magnetic field created when said coil is energized and on which said slug is supported as long as said coil remains energized, and means for automatically ejecting a slug from said surface upon deenergization of said coil.

2. Apparatus for preventing the use of slugs of magnetic material in a coin-operated device of the type having a coin receiving slot and a coin chute leading to the coin-actuated mechanism of the device, comprising an electromagnet having an energizing coil and a core extending axially beyond one end of the coil to a point adjacent the path of movement of a coin or slug passing from said coin slot to said coin chute, the axially extending portion of said core being so constructed and arranged as to provide a surface onto which a slug may be drawn by the magnetic field created when said coil is energized and on which said slug is supported as long as said coil remains energized, and means for automatically ejecting a slug from said surface upon deenergization of said coil comprising a resilient member of non-magnetic material having a portion normally projecting in one direction over said slug supporting surface but yieldably movable in the opposite direction when a slug is drawn onto said surface, said portion of said resilient member remaining in contact with said slug and acting to push the latter off said surface when said coil is deenergized and the resiliency of said member tends to return said portion to its normal position.

3. Apparatus for preventing the use of slugs of magnetic material in a coin-operated device of the type having a coin receiving slot and a coin chute leading to the coin-actuated mechanism of the device, comprising an electromagnet having an energizing coil and a core extending axially beyond one end of the coil to a point adjacent the path of movement of a coin or slug passing from said coin slot to said coin chute, the axially extending portion of said core being so constructed and arranged as to provide a surface onto which a slug may be drawn by the magnetic field created when said coil is energized and on which said slug is supported as long as said coil remains energized, and means for automatically ejecting a slug from said surface upon deenergization of said coil comprising a resilient member of non-magnetic material in the form of a leaf spring having a tongue portion normally projecting in one direction over said slug supporting surface but yieldably movable in the opposite direction when a slug is drawn onto said surface and a second portion normally abutting the axially extending portion of said core so as to establish the normal position of said tongue portion, said tongue portion remaining in contact with said slug as long as the latter is supported on said surface and acting to push the slug off said surface when said coil is deenergized and the resiliency of said spring tends to return said tongue portion to its normal position.

4. Apparatus for preventing the use of slugs of magnetic material in a coin-operated device of the type having a coin receiving slot and a coin chute leading to the coin-actuated mechanism of the device, comprising an electromagnet having an energizing coil and a core, an extension on said core having a pole face adapted to be positioned adjacent and substantially parallel to the path of movement of a coin or slug passing from said coin slot to said coin chute, said core extension being so constructed and arranged as to provide a surface onto which a slug may be drawn by the magnetic field created when said coil is energized and on which said slug is supported as long as said coil remains energized, and means for automatically ejecting a slug from said surface upon deenergization of said coil comprising a resilient member of non-magnetic material in the form of a leaf spring having a tongue normally projecting forwardly over said slug supporting surface but yieldably movable in a rearward direction when a slug is drawn onto said surface and a second tongue normally abutting the rear face of said core extension and adjustable so as to establish the normal position of said first named tongue, said first named tongue remaining in contact with said slug as long as the latter is supported on said surface and acting to push the slug off said surface when said coil is deenergized and the resiliency of said spring tends to return said first named tongue to its normal position.

5. Apparatus for preventing the use of slugs of magnetic material in a coin-operated device of the type having a coin receiving slot and a coin chute leading to the coin actuated mechanism of the device, comprising an electromagnet having an energizing coil and a core, an extension on said core adapted to be positioned adjacent the path of movement of a coin or slug passing from said coin slot to said coin chute and having an edge substantially perpendicular to said path onto which a slug may be drawn by the magnetic field created when said coil is energized and on which said slug is supported as long as said coil remains energized, and a resilient member of non-magnetic material adjacent said edge for automatically ejecting a slug therefrom upon deenergization of said coil.

6. Apparatus for preventing the use of slugs of magnetic material in a coin-operated device of the type having a coin receiving slot and a coin chute leading to the coin-actuated mechanism of the device, comprising an electromagnet having an energizing coil and a core, an extension on said core having a pole face adapted to be positioned adjacent and substantially parallel to the path of movement of a coin or slug passing from said coin slot to said coin chute, the upper edge of said pole face forming a ledge substantially perpendicular to said path onto which a slug may be drawn by the magnetic field created when said coil is energized and on which said slug is supported as long as said coil remains energized, means for automatically ejecting a slug from said ledge upon deenergization of said coil, and a plate of non-magnetic material fixed to the pole face of said core extension.

7. Apparatus for preventing the use of slugs of magnetic material in a coin-operated device of the type having a coin receiving slot and a coin chute leading to the coin-actuated mechanism of the device, comprising an electromagnet having an energizing coil and a core, an extension on said core having a pole face adapted to be positioned adjacent and substantially parallel to the path of movement of a coin or slug passing from said coin slot to said coin chute, the upper edge of said pole face forming a ledge substantially perpendicular to said path onto which a slug may be drawn by the magnetic field created when said coil is energized and on which said slug is supported as long as said coil remains energized, a resilient member of non-magnetic material adjacent said ledge for automatically ejecting a slug therefrom upon deenergization of said coil, and a relatively thin plate of non-magnetic material fixed to the pole face of said core extension.

8. In combination with a telephone pay station of the type having a casing, a hook for supporting a telephone instrument, a coin receptacle provided with a plurality of coin receiving recesses and associated slots, and a corresponding number of coin chutes within said casing leading to the coin-operated mechanism of the pay station, means for preventing the use of slugs of magnetic material for operating said telephone comprising a plurality of slug detecting units interposed between said coin receptacle and said casing, each of said units including an electromagnet having an energizing coil and a core extending axially beyond one end of the coil to a point adjacent the path of movement of a coin or slug passing from one of said coin slots to the associated coin chute, the axially extending portion of said core being so constructed and arranged as to provide a surface onto which a slug may be drawn by the magnetic field created when said coil is energized and on which said slug is supported as long as said coil remains energized, said surface being so positioned that a slug supported thereon substantially fills the coin slot and the lower portion of the associated coin receiving recess and thereby prevents the insertion of another slug in said recess, and means for automatically ejecting a slug from said surface upon deenergization of said coil, whereupon said slug is free to drop into the associated coin chute, and means controlled by said hook for supplying energy to the coils of said units.

9. In combination with a telephone pay station of the type having a casing, a hook for supporting a telephone instrument, a coin receptacle provided with a plurality of coin receiving recesses and associated slots, and a corresponding number of coin chutes within said casing leading to the coin-operated mechanism of the pay station, means for preventing the use of slugs of magnetic material for operating said telephone comprising a plurality of slug detecting units interposed between said coin receptacle and said casing, each of said units including an electromagnet having an energizing coil and a core extending axially beyond one end of the coil to a point adjacent the path of movement of a coin or slug passing from one of said coin slots to the associated coin chute, the axially extending portion of said core being so constructed and arranged as to provide a surface onto which a slug may be drawn by the magnetic field created when said coil is energized and on which said slug is supported as long as said coil remains energized, said surface being so positioned that a slug supported thereon substantially fills the coin slot and the lower portion of the associated coin receiving recess and thereby prevents the insertion of another slug in said recess, the lower end of said coin slot also being slanted toward said coil so that the slug supported on said surface is so tilted that the lower edge thereof cannot be moved off said surface by pressing against its upper edge through said recess, and means for automatically ejecting a slug from said surface upon deenergization of said coil, whereupon said slug is free to drop into the associated coin chute, and means controlled by said hook for supplying energy to the coils of said units.

10. In combination with a telephone pay station of the type having a casing, a hook for supporting a telephone instrument, a coin receptacle provided with a plurality of coin receiving recesses and associated slots, and a corresponding number of coin chutes within said casing leading to the coin-operated mechanism of the pay station, means for preventing the use of slugs of magnetic material for operating said telephone comprising a plurality of slug detecting units interposed between said coin receptacle and said casing, each of said units including an electromagnet having an energizing coil and a core, an extension on said core having a pole face positioned adjacent and substantially parallel to the path of movement of a coin or slug passing from one of said coin slots to the associated coin chute, the upper edge of said pole face forming a ledge onto which a slug may be drawn by the magnetic field created when said coil is energized and on which said slug is supported as long as said coil remains energized, said ledge being so positioned that a slug supported thereon substantially fills the coin slot and the lower portion of the associated coin receiving recess and thereby prevents the insertion of another slug in said recess, and means for automatically ejecting a slug from said ledge upon deenergization of said coil, whereupon said slug is free to drop into the associated coin chute, and means controlled by said hook for supplying energy to the coils of said units.

11. In combination with a telephone pay station of the type having a casing, a hook for supporting a telephone instrument, a coin receptacle provided with a plurality of coin receiving recesses and associated slots, and a corresponding number of coin chutes within said casing leading to the coin-operated mechanism of the pay station, means for preventing the use of slugs of magnetic material for operating said telephone comprising a plurality of slug detecting units interposed between said coin receptacle and said casing, each of said units including an electromagnet having an energizing coil and a core, an extension on said core having a pole face positioned adjacent and substantially parallel to the path of movement of a coin or slug passing from one of said coin slots to the associated coin chute, the upper edge of said pole face forming a ledge onto which a slug may be drawn by the magnetic field created when said coil is energized and on which said slug is supported as long as said coil remains energized, said ledge being so positioned that a slug supported thereon substantially fills the coin slot and the lower portion of the associated coin receiving recess and thereby prevents the insertion of another slug in said recess, a plate of non-magnetic material fixed to the pole face of said core extension, and a resilient member of non-magnetic material adjacent said ledge for automatically pushing a slug from said ledge upon deenergization of said coil, whereupon said slug is free to drop into the associated coin chute, and means controlled by said hook for supplying energy to the coils of said units.

12. In combination with a telephone pay station of the type having a lockable casing, a hook for supporting a telephone instrument, a coin receptacle provided with a plurality of coin receiving recesses and associated slots, and a corresponding number of coin chutes within said casing leading to the coin-operated mechanism of the pay station, means for preventing the use of slugs of magnetic material for operating said telephone comprising a plurality of slug detecting units interposed between said coin receptacle and said casing, each of said units including an electromagnet having an energizing coil and a core extending axially beyond one end of the coil to a point adjacent the path of movement of a coin or slug passing from one of said coin slots to the associated coin chute, the axially extending portion of said core being so constructed and arranged as to provide a surface onto which a slug may be drawn by the magnetic field created when said coil is energized and on which said slug is supported as long as said coil remains energized, said surface being so positioned that a slug supported thereon substantially fills the coin slot and the lower portion of the associated coin receiving recess and thereby prevents the insertion of another slug in said recess, and means for automatically ejecting a slug from said surface upon deenergization of said coil, whereupon said slug is free to drop into the associated coin chute, means controlled by said hook for supplying energy to the coils of said unit, a protective housing for said units, and means accessible only from within the pay station casing for connecting said housing to said casing.

References Cited in the file of this patent

UNITED STATES PATENTS

| | | |
|---|---|---|
| 2,040,166 | Garter | May 12, 1936 |
| 2,253,194 | Nixon | Aug. 19, 1941 |
| 2,583,258 | Donohue | Jan. 22, 1952 |